Feb. 11, 1936. E. P. KANENGEISER 2,030,796
SCOOTER
Filed May 28, 1934
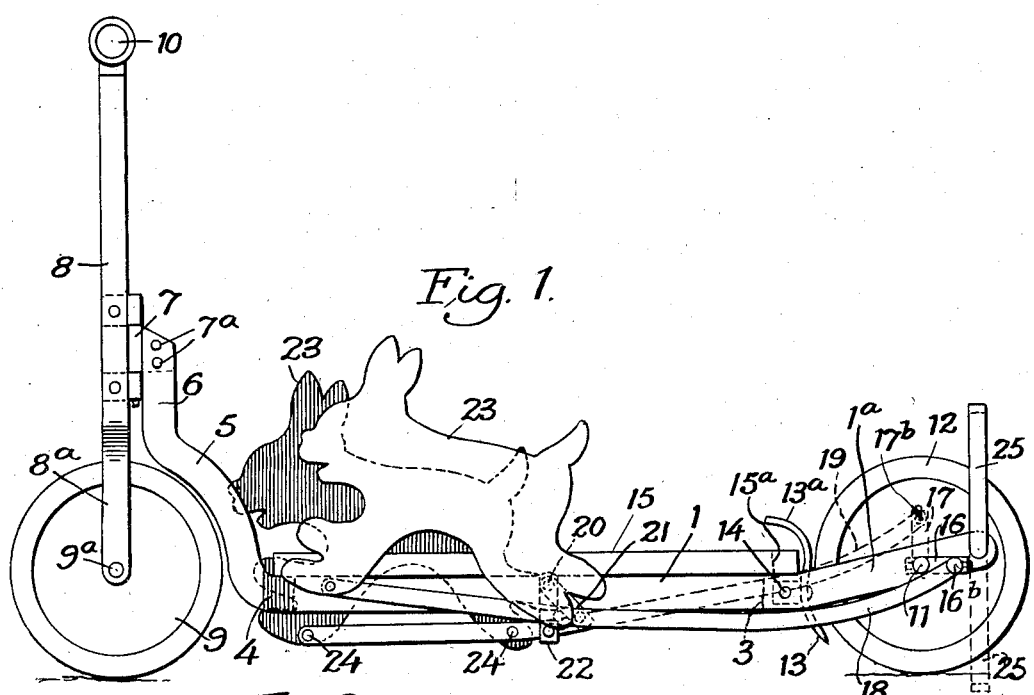
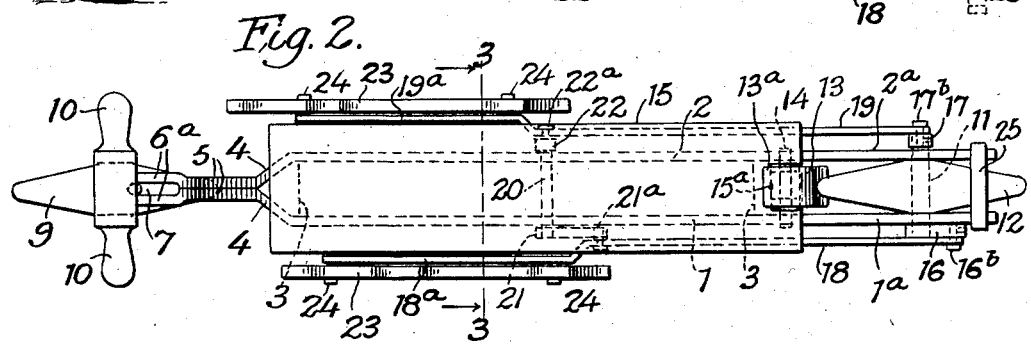
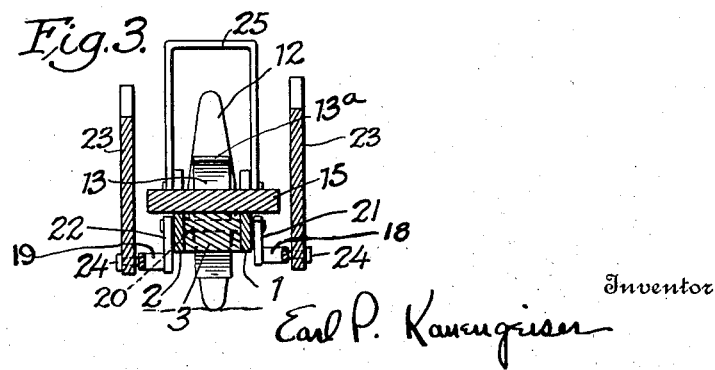
Inventor
Earl P. Kanengeiser
By
Attorney Patented Feb. 11, 1936

2,030,796

UNITED STATES PATENT OFFICE 2,030,796

SCOOTER

Earl P. Kanengeiser, Youngstown, Ohio

Application May 28, 1934, Serial No. 728,020

5 Claims. (Cl. 280—87.5)

The invention is a novel improvement in "scooters", i. e., child's vehicles consisting of a low frame having a single front wheel arranged for steering, and a single rear wheel and a low platform on the frame between the wheels upon which the child may place one foot, the child using his other foot to propel the vehicle along the ground; and the principal object of the invention is to provide such scooter or vehicle with a plurality of novel animal-like figures operated by compound linkage from the rear axle, whereby the figures will be alternately projected forwardly and vertically to give the appearance of a plurality of animals in the act of running, thereby greatly enhancing the desirability of applicant's scooter from the child's point of view.

Other minor objects of the invention will be hereinafter set forth.

I will explain the invention with reference to the accompanying drawing which illustrates one practical embodiment thereof to enable others familiar with the art to adopt and use the same; and will summarize in the claims the novel features of construction and novel combinations of parts for which protection is desired.

In said drawing:—

Fig. 1 is a side elevation of the scooter.

Fig. 2 is a plan view thereof.

Fig. 3 is a section on the line 3—3, Fig. 2.

As shown in the drawing, the scooter preferably consists of a pair of spaced side bars 1 and 2 having a filler 3, preferably of wood, secured therebetween. The side bars 1 and 2, beyond the forward end of filler 3, are joggled inwardly as at 4, and secured together, and the forward ends of the combined bars are bent upwardly in the form of a gooseneck 5 extending over the front wheel 9, the outer end of which gooseneck is bent upwardly as at 6 and is bifurcated as at 6a. One member of a hinge 7 is secured between the bifurcations by rivets 7a, the other member of the hinge being secured to the steering frame 8, the lower end of which is forked as at 8a. In the lower ends of the forks are bearings for axle 9a of front wheel 9. The bearings may be plain, ball, or roller bearings. The upper end of the steering frame 8 is provided with hand holds 10 whereby the vehicle may be steered in the usual manner.

The rear ends of the side bars 1 and 2 extend beyond filler 3 and are bent slightly upwardly as at 1a, 2a; and adjacent the rear ends of frame members 1 and 2 are bearings for the rear axle 11, upon which is fixedly mounted the rear wheel 12, the space between the members 1a and 2a being slightly greater than the width of the wheel at the hub.

An arcuate brake shoe 13 is preferably journaled on a pivot bolt 14 extending between the side bars 1 and 2 in rear of filler 3. The upper end of the brake shoe 13 is bent forwardly as at 13a and overlies the rear end of the foot board 15 which is mounted upon the tops of the side bars 1 and 2 and secured to the filler 3 in any desired manner. The rear end of foot board 15 is preferably recessed as at 15a, Fig. 2, to permit operation of the brake shoe 13.

At the rear ends of the side arms 1 and 2 beyond the rear axle 11 is pivoted a U-shaped stand 25, which when in raised position as shown in Fig. 1 will not interfere with the operation of the scooter, but when depressed as shown in dotted lines in Fig. 1 will support the scooter in upright position, the base when the stand is in use being of sufficient width to hold the scooter upright.

On the rear axle 11 at the outer sides of the side bars 1 and 2 are crank arms 16 and 17 which are respectively disposed about 90° apart, said arms being fixedly secured to the rear axle 11 by means of set screws. At the outer ends of the arms 16 and 17 are headed pins 16b and 17b which are retained in bores in the outer ends of the arms by means of set screws. Pivoted on the pins 16b, 17b respectively are levers 18 and 19 which extend outside and substantially parallel with the side bars 1 and 2. Journaled in the side bars 1 and 2 is a rocker shaft 20 projecting at each side of the side frame and on the ends of the rocker shaft 20 are loosely mounted rocker arms 21 and 22 disposed below the foot board 15 and at the outer ends of the rocker arms 21 and 22 are pins 21a and 22a secured in the said arms by means of set screws. The levers 18 and 19 are respectively pivoted upon the pins 21a and 22a whereby as the rear axle is rotated the levers 18, 19 will rock on the arms 21 and 22, giving the forward ends of the levers 18 and 19 a substantially elliptical motion.

The forward ends of the levers 18 and 19 beyond the pins 21a, 22a are joggled outwardly as at 18a—19a so as to clear the sides of the foot board 15, and animal-like figures 23 are mounted by means of pins or screws 24 on the forward joggled portions of levers 18 and 19, the pins 24 retaining the figures upright upon the links.

In operation, the child may propel the scooter along the ground by placing one foot on the foot board 15 between the animal-like figures 23, the child using his other foot to propel the vehicle in the usual manner, and as the rear wheel is rotated the axle 11 will be rotated and the levers 18 and 19, which are pivoted upon the rocker arms 21 and 22 and upon the crank arms 16 and 17 will be alternately projected in a substantially elliptical orbit to give the appearance of a pair of animals, such as dogs, running at the sides of the scooter, which feature will greatly enhance the desirability of the vehicle from the child's point of view.

I claim:—

1. In combination with a scooter having a wheeled main frame and having a wheeled steering frame connected with the main frame, a rocker arm carried by said main frame; a lever loosely pivoted intermediate its ends on said arm, eccentric means connected with said lever and operated by the rear wheel, and an animal-like figure carried by the lever whereby when the vehicle is moved the figure will be given a compound motion resembling an animal in the act of running.

2. In combination with a scooter having a wheeled main frame and having a wheeled steering frame connected with the main frame, a pair of rocker arms pivotally mounted at opposite sides of the main frame; a pair of levers loosely pivoted intermediate their ends on said arms, a pair of eccentrics connected with the levers and operated by the rear wheel, and a pair of animal-like figures carried by the levers respectively whereby when the vehicle is moved the figures will be given a compound motion resembling a pair of animals in the act of running.

3. In combination with a scooter having a wheeled main frame and having a wheeled steering frame pivotally connected with the main frame, a rock shaft journaled in the main frame intermediate its ends, a pair of rocker arms loosely mounted on said shaft at opposite sides of the main frame; a pair of levers pivoted intermediate their ends on said arms, a pair of eccentrics disposed approximately 90° apart connected with the levers and operated by the rear wheel, and a pair of animal-like figures carried by the levers respectively in advance of the rocker arms whereby when the vehicle is moved the figures will be given a compound motion resembling a pair of animals in the act of running.

4. In combination with a scooter having a wheeled main frame and having a wheeled steering frame pivotally connected with the main frame, a pair of rocker arms pivoted at opposite sides of the main frame; a pair of levers pivoted intermediate their ends on said arms and extending rearwardly adjacent the rear wheel, a pair of eccentric arms mounted on the axle of the rear wheel and connected with the levers respectively; and a pair of animal-like figures carried by the levers respectively in advance of the rocker arms whereby when the vehicle is moved the figures will be given a compound motion resembling a pair of animals in the act of running.

5. In combination with a scooter having a wheeled main frame and having a wheeled steering frame pivotally connected with the main frame, a rock shaft journaled in the main frame intermediate its ends; a pair of rocker arms on said shaft at opposite sides of the main frame; a pair of levers pivoted intermediate their ends on said arms respectively and extending rearwardly adjacent the rear wheel, a pair of eccentric arms mounted on the axle of the rear wheel and disposed approximately 90° apart and connected with the levers respectively and operated by the rear wheel, and a pair of animal-like figures carried by the levers respectively in advance of the rocker arms whereby when the vehicle is moved the figures will be given a compound motion resembling a pair of animals in the act of running.

EARL P. KANENGEISER.